(12) United States Patent
Fernandez

(10) Patent No.: US 6,588,562 B2
(45) Date of Patent: Jul. 8, 2003

(54) SYNCHRONIZER

(75) Inventor: Josevaldo Roberto Fernandez, Salto-Sp. (BR)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/053,036

(22) Filed: Nov. 6, 2001

(65) Prior Publication Data
US 2002/0079184 A1 Jun. 27, 2002

(30) Foreign Application Priority Data

Nov. 27, 2000 (BR) .............................. 0006745

(51) Int. Cl.[7] .............................................. F16D 23/06
(52) U.S. Cl. ................... 192/53.31; 192/53.32; 192/53.34
(58) Field of Search ................ 192/48.91, 53.31, 192/53.32, 53.34, 53.341, 53.36, 53.361; 74/339

(56) References Cited

U.S. PATENT DOCUMENTS

| | | | | |
|---|---|---|---|---|
| 2,221,892 A | * | 11/1940 | Orr ...................... 192/53.341 |
| 5,135,087 A | | 8/1992 | Frost ......................... 192/53 F |
| 5,425,437 A | * | 6/1995 | Nellums .................... 192/53.3 |
| 5,507,376 A | * | 4/1996 | Skotnicki ................. 192/48.91 |
| 5,544,727 A | * | 8/1996 | Braun ...................... 192/48.91 |
| 5,588,516 A | * | 12/1996 | Braun et al. ............. 192/48.91 |
| 5,678,670 A | | 10/1997 | Olsson .................... 192/53.32 |
| 5,738,194 A | * | 4/1998 | Hughes ...................... 192/48.4 |
| 5,901,824 A | | 5/1999 | Nellums .................. 192/53.31 |
| 6,443,281 B2 | * | 9/2002 | Jackson et al. .......... 192/53.31 |

FOREIGN PATENT DOCUMENTS

DE  1 098 824  * 2/1961

* cited by examiner

Primary Examiner—Richard M. Lorence
(74) Attorney, Agent, or Firm—Kevin M. Hinman; Howard D. Gordon; Paul S. Rulon

(57) ABSTRACT

A baulkring-type synchronizer (18) includes multiple cone friction surfaces (28a, 36a 32a 36b and 30a, 38a, 34a, 38b) and jaw clutch spline teeth (26a, 20a, 22a) for frictionally synchronizing and positive connecting gears (14,16) to a shaft (12). Inner rings 32, 34 respectively define the friction surfaces (32a, 34a) and ramp surfaces (32b, 34b) that move a boost member 42 radially outward to engage self-energizing surfaces (44c, 26g and 44d, 26f) to provide additive self-energizing forces in response to limited rotation of the inner rings by synchronizing torque.

11 Claims, 2 Drawing Sheets

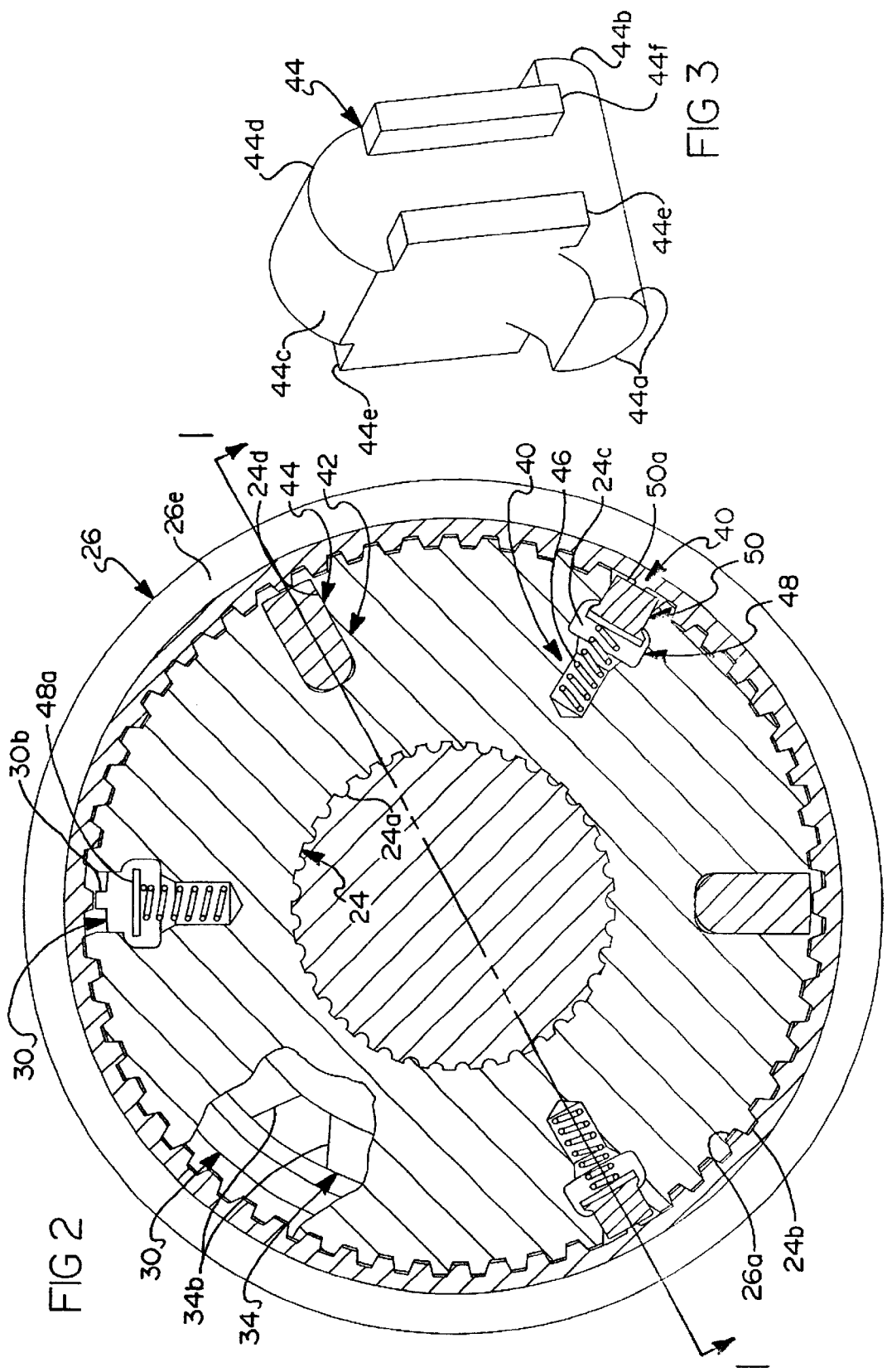

SYNCHRONIZER

FIELD OF THE INVENTION

This invention relates to a synchronizer having multiple friction cones and self-energizing.

BACKGROUND OF THE INVENTION

A Synchronizer with multiple friction cones and self-energizing may be seen by reference to the baulkring-type synchronizer in U.S. Pat. No. 5,135,087. This synchronizer includes friction and jaw members for synchronizing and positively clutching a gear to a shaft, pre-energizer assemblies for engaging the friction members in response to an operator shift force effecting initial engaging movement of a shift sleeve, a hub rotatably fixed to the shaft and having external spline teeth slidably receiving internal spline teeth of the shift sleeve which defines one of the jaw members, and a baulkring having blocker teeth for arresting engaging movement of the shift sleeve until synchronization is reached and for transferring a shift force from the sleeve to increase the engaging force of the friction members to a force proportional to operator shift force. The friction members include a middle friction member that rotates with the gear and that is sandwiched between outer and inner friction rings in fixed rotation with hub. The middle friction ring includes torque drive tangs having cam surfaces that engage cam surfaces fixed to the gear. Engagement of these cam surfaces during synchronizing draws the middle friction ring toward the inner friction ring thereby increasing the engagement force there between to provide a first additive force or self-energizing force proportional to the synchronizing torque.

SUMMARY OF THE INVENTION

An object of this invention is to provide improved self-energizing for a synchronizer with multiple friction cones.

According to a feature of the invention, a synchronizer is for first and second drives disposed for rotation about a common axis and secured against axial movement relative to each other. The synchronizer includes a hub affixed to the first drive and having external splines. A shift sleeve includes internal spines continuously mating with the hub external splines and is selectively engagable with external splines affixed to the second drive in response to engaging movement of the shift sleeve by a first shift force. The shift sleeve has first blocker surfaces. A first inner ring has an external cone friction surface. A first cone member is rotatable with the second drive and has external and internal cone friction surfaces. A first baulkring is mounted for limited rotation relative to the hub and has an internal cone friction surface and second blocker surfaces. Pre-energizer means is for engaging the baulkring and inner ring friction surfaces respectively with the cone member external and internal friction surfaces in response to initial engaging movement of the shift sleeve by the first shift force and for positioning the blocker surfaces for engagement to prevent asynchronous engagement of the shift sleeve and second drive splines, and to transmit the first shift force to the engaged friction surfaces with an engaging force producing a synchronizing torque. Self-energizing means is operative to react the synchronizing torque for producing a first additive force in the direction of the first shift force for increasing the engagement force of the engaged friction surfaces.

The improvement comprising the first inner ring mounted for limited rotation relative to the hub and having first ramp means; and the self-energizing means including a boost member disposed in a radially extending opening in the hub and moved radially outward by the first ramp means in response to the synchronizing torque, and the boost member having a first boost surface engagable with a second boost surface affixed to the shift sleeve for producing the first additive force.

BRIEF DESCRIPTION OF THE DRAWINGS

The synchronizer of the invention is shown in the accompanying drawings in which:

FIG. 2 is a sectional view of the synchronizer taken along line 2—2 of FIG. 1; and FIG. 3 is an enlarged perspective view of a boost member in FIGS. 1 and 2.

DETAILED DESCRIPTION OF THE DRAWINGS

Figure 1:
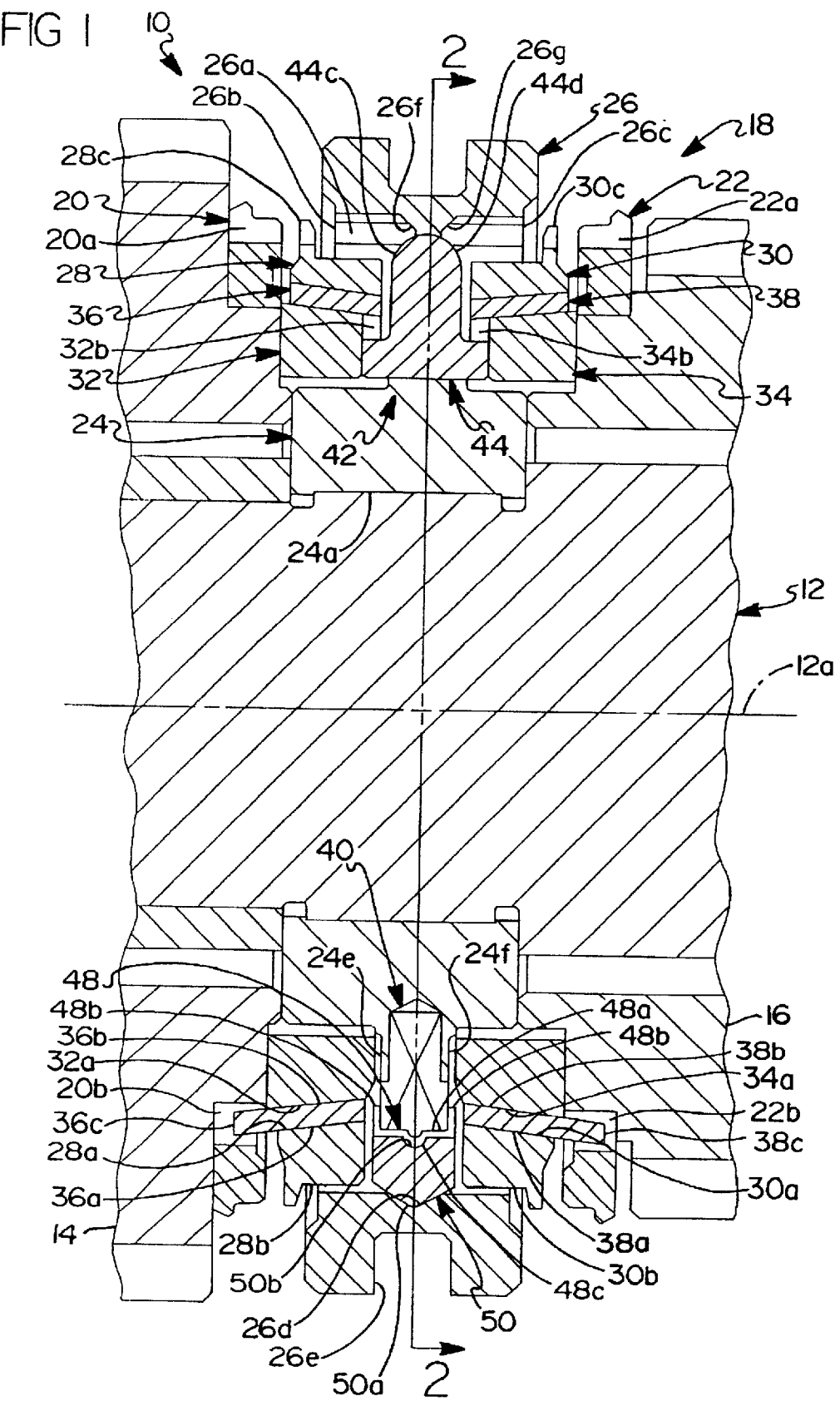
FIG. 1 is sectional view of the synchronizer taken along line 1—1 of FIG. 2.

The term "synchronizer" shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" or "boost" shall designate a force increasing mechanism such as ramps or cams or the like to increase the engaging force of the synchronizing clutch in proportion to the synchronizing torque of the friction clutch.

Looking now at FIGS. 1–3, therein is shown a gear and synchronizer assembly 10 which forms part of a multi-ratio change speed transmission. Assembly 10 includes a partially shown drive or shaft 12 mounted for rotation about a central axis 12a, axially spaced apart and partially shown drives or gears 14,16 supported on the shaft for rotation relative thereto and secured against axial movement relative to the shaft in known manner, and a double acting synchronizer clutch mechanism 18. The invention may provide self-energizing to both gears, as disclosed herein, or to only one of the gears. Also, the invention is readily used in a single acting synchronizer.

Synchronizer 18 includes annular members 20, 22 affixed to gears 14, 16 in any of several known manners and having external spline teeth 20a, 22a defining jaw teeth, a hub 24 affixed at a central opening 24a thereof to shaft 12, a jaw clutch or shift sleeve 26 having internal spline teeth 26a defined in a central opening thereof and in constant mesh with external spline teeth 24b on the outer circumference of the hub, baulkrings 28, 30, inner rings 32, 34 having external cone friction surfaces 32a, 34a, middle cone members 36, 38, pre-energizer assemblies 40 disposed in openings 24c in the hub, and self-energizing assemblies 42 each having a radially moveable link or boost member 44 disposed in an opening 24d in the hub. Herein, the synchronizer includes three pre energizer assemblies and three self-energizing assemblies.

Baulkrings 28, 30 are mounted for limited rotation relative to the hub in known manner, by ribs 28b, 30b that react against hub surfaces defined by pre-energizer assembly openings 24c. One of ribs 30b is made visible at the 12 o'clock position in FIG. 2 by removal of a part of one of the pre-energizers 40. Baulkrings 28, 30 include blocker teeth 28c, 30c having angled blocker surfaces that react in known manner against angled blocker surfaces defined on opposite ends 26b, 26c of jaw teeth defined by shift sleeve splines 26a.

Middle cone members 36, 38 include external and internal cone friction surfaces 36a, 38a and 36b, 38b, and torque drive tangs 36c, 38c that drivingly connect to members 20, 22 via windows 20b, 22b. The driving connection between the tangs and windows may be parallel to the axis of shaft 12 or at an angle as shown in previously mentioned U.S. Pat. No. 5,135,087.

Inner rings 32, 34 are mounted for limited rotation relative to hub 24 by action of inner ring ramp surfaces 32b, 34b reacting against ramp surfaces 44a, 44b on each boost member 44, as explained further hereinafter.

As is readily seen, friction surfaces 28a, 36a, 36b, 32a and 30a, 38a, 38b, 34a pair up to define friction clutches for respectively synchronizing the gears 14, 16 to the shaft prior to engagement of the associated jaw clutch members. The friction surfaces may be defined by any of several known friction materials affixed to the base member, e.g., pyrolytic carbon friction materials such as disclosed in U.S. Pat. Nos. 4,700,823; 4,844,218 and 4,778,548 may be used. These patents are incorporated herein by reference.

Internal and external spline teeth 26a, 24b have axially extending flank surfaces which continuously mate in close sliding relation so that there is relatively no free play between shift sleeve 26 and hub 24. Opposite ends of internal splines teeth 26a define jaw teeth which mate with external spline teeth 20a, 22a to positively connect the gears to the shaft. The flank sides of spline teeth 26a and 20a, 22a may be provided with an anti-back out or locking angle feature to prevent inadvertent disengagement of the spline teeth. Details of this feature may be seen by reference to U.S. Pat. No. 4,727,968 which is incorporated herein by reference.

Pre-energizer assemblies 40 may be any of several known types or like the assemblies herein that are shown in greater detail in co-pending patent application Ser. No. 10/053,420 filed Nov. 6, 2001 and having attorney docket number 99-TBR-151. Each pre-energizer assembly 40 includes a helical compression spring 46, a spring holder 48 and a strut 50 disposed in the radially extending bore 24c in hub 24. Spring holder 48 includes an axially extending base portion 48a reacting between spring 46 and strut 50 and radially extending tabs 48b that slidably embrace opposite sides 24e, 24f of hub 24 to prevent axial movement of the spring holder relative to the hub. Strut 50 includes a ramp 50a disposed in a recess 26d in an associated shift sleeve spline 26a when the shift sleeve is in the neutral position of FIG. 1. In an analogous manner the interface of base portion 48a and strut 50 includes a ramp 48c and a recess 50b that has less force transmitting capacity than ramp/recess 50a/26d. Accordingly, when the shift sleeve is moved axially toward engagement with the spline teeth affixed to either gear, the axial force provided by ramp/recess 50a/26a overcomes ramp/recess 48c/50b and moves the strut axially against the baulkring in the direction of the shift force to effect initial frictional engagement of the associated cone friction surfaces. During engagement of the shift sleeve spline teeth 26a with either of spline teeth 20a or 22a, ramps 50a have moved out of recesses 26d and on to an axially extending portion of the associated spline teeth 26a. When the shift sleeve is being returned to the neutral position of FIG. 1, friction between ramps 50a and the axially extending portion of spline teeth 26a moves strut 50 toward the baulkring in the direction of the shift sleeve return movement until ramp/recess 48c/50b engage and prevent further movement of the strut, thereby preventing unwanted momentary engagement of the baulkring cone friction surface.

When it is desired to couple either gear to the shaft, and unshown mechanism, such as in U.S. Pat. No. 4,920,815 and incorporated herein by reference, moves shift sleeve 26 axially via an unshown shift fork in a shift sleeve groove 26e along the axis of shaft 12 either left to couple gear 14 or right to couple gear 16. The shift mechanism may be manually moved by an operator through a linkage system, may be selectively moved by an actuator, or may be moved by means which automatically initiates shift mechanism movement and which also controls the magnitude of shift force applied to the shift sleeve. Regardless of which shift mechanism is used, the pre-energizer assemblies apply a pre-energizer force less than the force applied by shift force and that is determined by the pre-energizer spring force and ramp angles of struts 50 and recesses 26d. The pre-energizer force, depending on direction of shift sleeve movement, moves either baulkring friction surface 28a or 30a into initial engagement with its associated friction surfaces to clock the associated baulkring to a position relative to hub 24 for positioning to blocker teeth for engagement in known manner.

Self-energizing assemblies 42 each include the pairs ramp surfaces 32b, 34b that diverge radially outwardly from each other as shown for ramp surfaces 34b in the broken open portion of hub 24 in FIG. 2, the boost member 44 having the ramp surfaces 44a, 44b that respectively react against ramp surfaces 32b, 34b and self-energizing surfaces 44c, 44d that respectively react against self-energizing surfaces 26g, 26f formed from one of shift sleeve splines 26a.

The following operation assumes an asynchronous condition exists between shaft 12 and a gear to be synchronized. When the shift force moves shift sleeve 26 left or right from the neutral position to effect synchronizing and positive connection of one of the gears with the shaft, the pre-energizers effect initial engagement of the cone friction surfaces in the direction of the shift force. The initial frictional engagement ensures rotational positioning of the baulkring to effect engagement of the baulkring blocker surfaces with the shift sleeve blocker surfaces to prevent asynchronous engagement of shift sleeve splines with splines 20a or 22a affixed to the gears. Engagement of the blocker surfaces allows full operator shift force to be applied to the engaged friction surfaces, thereby producing a synchronizing torque proportional to the shift force. This synchronizing torque rotates the inner ring of the associated engaged cone friction surface, thereby causing the inner ring ramp surfaces to engage the boost member ramp surfaces and move the boost member self-energizing surfaces up into engagement with the shift sleeve self-energizing surfaces to apply an additive force in the direction of the shift force. When the shift sleeve is moved left to synchronize gear 14, self-energizing surfaces 44d engage self-energizing surfaces 26f to provide the additive force. When the shift sleeve is moved right to synchronize gear 16, self-energizing surfaces 44c engage self-energizing surfaces 26g to provide the additive force. Axial movement of boost member 44 relative to the hub is prevented by pairs of flanges 44e, 44f extending from opposites sides of the boost member and slidably embracing hub side walls 24e, 24f. This additive force sums with the operator shift force and is transmitted to all of the engaged cone friction surfaces via the engaged blocker teeth, thereby increasing the engagement force of all of the engaged friction surfaces.

A synchronizer with improved self-energizing has been disclosed. The following claims are intended to cover the inventive portions of the disclosed synchronizer and variations and modifications believed to be within the spirit of the invention.

What is claimed is:

1. A synchronizer for first and second drives disposed for rotation about a common axis and secured against axial movement relative to each other; the synchronizer including:

a hub affixed to the first drive and having external splines;

a shift sleeve including internal spines continuously mating with the hub external splines and selectively engagable with external splines affixed to the second drive in response to engaging movement of the shift sleeve by a first shift force, and the shift sleeve having first blocker surfaces;

a first inner ring having an external cone friction surface;

a first cone member rotatable with the second drive and having external and internal cone friction surfaces;

a first baulkring mounted for limited rotation relative to the hub and having an internal cone friction surface and second blocker surfaces;

pre-energizer means for engaging the baulkring and inner ring friction surfaces respectively with the cone member external and internal friction surfaces in response to initial engaging movement of the shift sleeve by the first shift force and for positioning the blocker surfaces for engagement to prevent asynchronous engagement of the shift sleeve and second drive splines, and to transmit the first shift force to the engaged friction surfaces with an engaging force producing a first synchronizing torque;

self-energizing means operative to react the first synchronizing torque for producing a first additive force in the direction of the first shift force for increasing the engagement force of the engaged friction surfaces; the improvement comprising:

the first inner ring mounted for limited rotation relative to the hub and having first ramp means, and the self-energizing means including a boost member disposed in a radially extending opening in the hub and moved radially outward by the first ramp means in response to the first synchronizing torque, and the boost member having a first boost surface engagable with a second boost surface affixed to the shift sleeve for producing the first additive force.

2. The synchronizer of claim 1, further including a third drive axially spaced from the second drive and secured against axial movement and for relative rotation about the common axis;

the shift sleeve internal spines selectively engagable with external splines affixed to the third drive in response to engaging movement of the shift sleeve by a second shift force, and the shift sleeve having third blocker surfaces;

a second inner ring having an external friction surface and second ramp means;

a second cone member rotatable with the third drive and having external and internal cone friction surfaces;

a second baulkring mounted for limited rotation relative to the hub and having an internal cone friction surface and fourth blocker surfaces;

the pre-energizer means for engaging the second baulkring and second inner ring friction surfaces respectively with the second cone member external and internal friction surfaces in response to initial engaging movement of the shift sleeve by the second shift force, and for positioning the third and fourth blocker surfaces for engagement to prevent asynchronous engagement of the shift sleeve internal splines with the third drive splines and to transmit the second shift force to engaged friction surfaces with an engaging force producing a second synchronizing torque;

the self-energizing means operative to react the second synchronizing torque for producing a second additive force in the direction of the second shift force for increasing the engagement force of the engaged friction surfaces; and the boost member moved radially outward by the second inner ring ramp means in response to the second synchronizing torque and the boost member having a third boost surface engagable with a fourth boost surface affixed to the shift sleeve for producing the second additive force.

3. The synchronizer of claim 1, wherein:

the first inner ring ramp means includes ramp surfaces defining a v-shaped recess receiving a radially inner end of the boost member for moving the boost member radially outward in response to the second synchronizing torque being for an upshift or downshift.

4. The synchronizer of claim 2, wherein:

the first and second inner ring ramp means each include ramp surfaces defining a v-shaped recess receiving a radially inner end of the boost member for moving the boost member radially outward in response to the first and second synchronizing torque being for an upshift or downshift.

5. The synchronizer of claim 1, wherein:

the boost member is secured against axial movement relative to the hub.

6. A synchronizer for frictionally synchronizing and positive connecting first and second drives disposed for relative rotation about a common axis; the synchronizer comprising:

a first jaw means axially movable into engagement with a second jaw means for positive connecting the drives in response to engaging movement of the first jaw means by an first shift force;

connecting means connecting the first jaw means for axial and non-rotational movement relative to the first drive;

first friction means rotatable with the first drive and having a friction surface axially movable into engagement with a friction surface of a second friction means in response to the engaging movement of the first jaw means for producing a first synchronizing torque, the second friction means rotatable with the second drive;

first blocker means movable into engagement in response to the engaging movement of the first jaw means for preventing asynchronous engagement of the first and second jaw means and for transmitting the first shift force to the first friction means to effect an engagement force of the first and second friction means friction surfaces;

self-energizing means operative to react the first synchronizing torque for producing a first additive axial force in the direction of the first shift force, for increasing the engagement force of the first and second friction means friction surfaces, the self-energizing means including a link rotatable with the first drive and mounted for limited radial movement relative to the axis;

a first annular means mounted for limited rotational movement relative to the first drive in response to the first synchronizing torque for effecting radial movement of the link in response to the limited rotational movement; characterized by:

the second friction means having another friction surface; and the first annular means having a friction surface movable into engagement with the second friction means other friction surface in response to the engaging movement of the first jaw means, and the first annular means having first ramp means operative to move the link radially outward into engagement with a first boost surface affixed to the first jaw means for producing the first additive axial force.

7. The synchronizer of claim 6, further including a third drive axially spaced from the second drive and secured against axial movement and for rotation about the common axis relative to the first and second drives;

the first jaw means axially movable into engagement with a third jaw means for positive connecting the first and third drives in response to engaging movement of the first jaw means by a second shift force;

third friction means rotatable with the first drive and having a friction surface axially movable into engagement with a friction surface of a fourth friction means in response to the engaging movement of the first jaw means by the second shift force for producing a synchronizing torque, the fourth friction means rotatable with the third drive;

second blocker means movable into engagement in response to the engaging movement of the first jaw means by the second shift force for preventing asynchronous engagement of the first and third jaw means and for transmitting the second shift force to the third friction means to effect an engagement force of the third and fourth friction means friction surfaces;

the self-energizing means operative to react the second synchronizing torque for producing a second additive axial force in the direction of the second shift force for increasing the engagement force of the third and fourth friction means friction surfaces; and a second annular means having a friction surface movable into engagement with another friction surface of the fourth friction means in response to the engaging movement of the first jaw means by the second shift force, the second annular means mounted for limited rotational movement relative to the first drive in response to the synchronizing torque and having ramp means for moving the link into engagement with a second boost surface for producing the second additive axial force in response to the limited rotational movement.

8. The synchronizer of claim 6, wherein:
all of the friction surfaces are cone shaped.

9. The synchronizer of claim 7, wherein:
all of the friction surfaces are cone shaped.

10. The synchronizer of claim 6, wherein:
the connecting means includes a hub having external splines concentric to the common axis and affixed to the first drive;

the first jaw means is defined by a shift sleeve having internal spline teeth in sliding mesh with the hub external spline teeth and an inner portion of the shift sleeve having the first boost surface affixed thereto; and the link mounted in an opening in the hub for radial movement and non-axial movement, the link including a first end facing radially inward and having second ramp means for contact with the first ramp means, and including a second end facing radially outward and having a second boost surface for contact with the first boost surface for producing the first additive axial force.

11. The synchronizer of claim 7, wherein:
the connecting means includes a hub having external splines concentric to the common axis and affixed to the first drive;

the first jaw means is defined by a shift sleeve having internal spline teeth in sliding mesh with the hub external spline teeth, and an inner portion of the shift sleeve having the first and second boost surfaces affixed thereto; and the link mounted in an opening in the hub for radial movement and non-axial movement, the link including a first end facing radially inward and having third and fourth ramp means for contact respectively with the first and second ramp means, and including a second end facing radially outward and having third and fourth boost surfaces for contact respectively with the first and second boost surfaces for producing the first and second additive axial forces.

* * * * *